US008250645B2

(12) United States Patent
Abdel-Aziz et al.

(10) Patent No.: US 8,250,645 B2
(45) Date of Patent: Aug. 21, 2012

(54) MALWARE DETECTION METHODS AND SYSTEMS FOR MULTIPLE USERS SHARING COMMON ACCESS SWITCH

(75) Inventors: Bassem Abdel-Aziz, Kanata (CA); Stanley Chow, Ottawa (CA); Shu-Lin Chen, Kanata (CA)

(73) Assignee: Alcatel Lucent, Paris (FR)

( * ) Notice: Subject to any disclaimer, the term of this patent is extended or adjusted under 35 U.S.C. 154(b) by 936 days.

(21) Appl. No.: 12/145,768

(22) Filed: Jun. 25, 2008

(65) Prior Publication Data

US 2009/0328220 A1    Dec. 31, 2009

(51) Int. Cl.
*H04L 29/06* (2006.01)
(52) U.S. Cl. .......................... 726/13; 713/153
(58) Field of Classification Search .............. 726/22–25; 713/154
See application file for complete search history.

(56) References Cited

U.S. PATENT DOCUMENTS

| 5,170,391 | A | 12/1992 | Arnold et al. |
| 6,675,209 | B1 | 1/2004 | Britt |
| 7,490,350 | B1 | 2/2009 | Murotake et al. |
| 7,917,621 | B2* | 3/2011 | Suzuki et al. ............... 709/225 |
| 7,936,682 | B2* | 5/2011 | Singh et al. ............... 370/241 |
| 2004/0054925 | A1 | 3/2004 | Etheridge et al. |
| 2004/0250114 | A1* | 12/2004 | Parekh et al. ............... 713/201 |
| 2006/0174342 | A1 | 8/2006 | Zaheer et al. |
| 2007/0011741 | A1 | 1/2007 | Robert et al. |
| 2007/0067845 | A1 | 3/2007 | Wiemer et al. |
| 2007/0067847 | A1 | 3/2007 | Wiemer et al. |
| 2007/0067848 | A1 | 3/2007 | Gustave et al. |
| 2007/0192862 | A1* | 8/2007 | Vermeulen et al. ............. 726/23 |
| 2007/0237080 | A1* | 10/2007 | Savagaonkar ................ 370/235 |
| 2007/0286085 | A1 | 12/2007 | Rabinovitch |

FOREIGN PATENT DOCUMENTS

| WO | WO 2006-081507 | 8/2006 |
| WO | WO 2006-103337 | 10/2006 |
| WO | WO 2008-090531 A3 | 7/2007 |

OTHER PUBLICATIONS

Whyte, et al., ARP-based Detection of Scanning Worms Within an Enterprise Network, pp. 1-15, Jan. 31, 2005.
Whyte, et al., DNS-based Detection of Scanning Worms in an Enterprise Network, Aug. 24, 2004, pp. 1-17.
Oorschot, et al., A Monitoring System for Detecting Repeated Packets with Applications to Computer Worms, Int. J. Inf. Secur. (2006) Mar. 8, 2006, Springer-Verlag
Jiang, et al., An Improved Real-Time Traffic Flow Monitoring Scheme, National University of Singapore, 2006.
Mirkovic, J. "D-WARD: Source-End Defense Against Distributed Denial-of-Service Attacks" 2003, XPOO7906244, Univ. of Cali. USA http://lasr.cs.ucla.edu/ddos/dward-thesis.pdf.
Chow et al, "A Containment Mechanism for Potentially Contaminated End System", U.S. Appl. No. 11/656,434, filed Jan. 23, 2007.

(Continued)

*Primary Examiner* — Gilberto Barron, Jr.
*Assistant Examiner* — Malcolm Cribbs
(74) *Attorney, Agent, or Firm* — Fay Sharpe LLP

(57) ABSTRACT

Malware detection systems and methods are presented in which header data of protocol data units (PDUs) are examined at a wireless access switch shared by multiple clients, and the PDU type and client are used to establish counters, with the count values being analyzed to identify clients suspected of being infected with malware.

16 Claims, 3 Drawing Sheets

OTHER PUBLICATIONS

Ruoming Pang, Mark Allman, Mike Bennett, Jason Lee, Vern Paxson, and Brian Tierney, "A First Look at Modern Enterprise Traffic", Princeton University, International Computer Science Institute, Lawrence Berkeley National Laboratory, 2005.

Jaeyeon Jung, Vern Paxson, Arthur W. Berger, and Hari Balakrishnan, "Fast Portscan Detection Using Sequential Hypothesis Testing", MIT Computer Science and Artificial Intelligence Laboratory, Cambridge, MA, USA, ICSI Center for Internet Research, and Lawrence Berkeley National Laboratory, Berkeley, CA, USA, 2004.

David Whyte, Evangelos Kranakis, and P.C. Van Oorschot, "DNS-Based Detection of Scanning Worms in an Enterprise Network", School of Computer Science, Carleton University, Ottawa, Ontario, Canada, 2005.

Stuart E. Schechter, Jaeyeon Jung, and Arthur W. Berger, "Fast Detection of Scanning Worm Infections", Harvard Deas, Cambridge, MA, MIT CSAIL, Cambridge, MA, 2004.

Shobha Venkataraman, Dawn Song, Phillip B. Gibbons, and Avrim Blum, New Streaming Algorithms for Fast Detection of Superspreaders, Carnegie Mellon University, Intel Research Pittsburg, 2005.

David Whyte, P.C. Van Oorschot, and Evangelos Kranakis, "ARP-Based Detection of Scanning Worms Within an Enterprise Network", School of Computer Science, Carleton University, Ottawa, Canada, Jan. 31, 2005.

Paul C. Van Oorschot, Jean-Marc Robert, and Miguel Vargas Martin, "A Monitoring System for Detecting Repeated Packets with Applications to Computer Worms", published online Mar. 8, 2006.

Nicholas Weaver, Stuart Staniford, and Vern Paxson, "Very Fast Containment of Scanning Worms", 2004.

* cited by examiner

MALWARE DETECTION METHODS AND SYSTEMS FOR MULTIPLE USERS SHARING COMMON ACCESS SWITCH

INCORPORATION BY REFERENCE

U.S. patent application Ser. No. 11/656,434, filed Jan. 23, 2007, entitled A CONTAINMENT MECHANISM FOR POTENTIALLY CONTAMINATED END SYSTEMS, by Chow et al. is hereby incorporated by reference in its entirety.

FIELD OF THE INVENTION

This invention relates generally to the field of networked communications, and more particularly to methods and systems for detecting malware for multiple users sharing a common point of access.

BACKGROUND OF THE INVENTION

Computer networks are often plagued by malware such as worms that use the resources of network processing devices without the knowledge and permission of the owner. Worms are computer programs that self-replicate by sending network packets to unguarded elements of the network. This type of malware is often used for identity theft and financial fraud, and thus poses a threat to users of the Internet and to businesses that have an online presence. Fast spreading "flash worms" are particularly troublesome, and worms like Code Red and Nimda have caused major congestions in the internet as well as shutting down the entire network of many enterprises. Different approaches currently exist for identifying and preventing further spread of such malware, including signature-based methods, traffic anomaly methods, and so-called honey-spot techniques. Signature-based techniques are largely ineffective since it takes time to write a signature and test it, and it is very easy for worms to change signatures to avoid detection and remedial action. Moreover, this approach requires the costly and tedious task of keeping anti-virus software up to date, whereby these methods are largely ineffective against flash worms. The incorporated copending U.S. patent application Ser. No. 11/656,434, filed Jan. 23, 2007 by Chow et al. is directed to detection of fast scanning worms in a conventional network switch having a single host computer connected to a dedicated switch port, and accordingly does not need to perform anti-spoofing since suspected worms are associated with a physical port. Wireless LANs are becoming more and more prevalent, however, in which portable computers and other wireless clients gain access to the network via shared localized access points, which are connected to the switch port. As there are potentially many clients associated with a given switch port, this solution is not suited for wireless networks, as the detection is unable to resolve the identity of a particular client device, and instead only identifies the access point (port) as infected. Other conventional traffic anomaly solutions can provide quick detection capabilities, but require complex processing that cannot be done at the fast data-path, and instead are primarily implemented in stand-alone switches that incorporate the worm detection function. Therefore, a need remains for improved methods and systems for malware detection to identify local clients served by WiFi and other networks that are suspected of being infected with malware without requiring dedicated switches or servers for malware detection.

SUMMARY OF THE INVENTION

The following is a summary of one or more aspects of the invention to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter.

In accordance with one or more aspects of the present disclosure, a method is provided for identifying clients sharing a common access switch in a wireless local area network suspected of being infected with malware. The method includes examining header data of protocol data units (PDUs) at the common access switch and determining a PDU type and a client address for each PDU based on the header data. The client address can be any port-independent address that uniquely identifies the client device, such as a MAC address of a client that shares a common port access point of a wireless access switch. This allows the malware detection to differentiate the behavior of multiple clients that share a common switch port in WiFi or other networks. The method also includes maintaining a plurality of counters for providing PDU count values based at least partially on the PDU type for individual clients of the access switch, and providing a limits table with preset limits corresponding to each count value and a rules set that defines attack patterns for the access switch. The method further includes selectively identifying clients of the common access switch that are suspected of being infected with malware based at least in part on the count values, the limits table, and the rules set.

In accordance with certain embodiments, the header data is examined to determine a client MAC address for each PDU and counters are maintained for each client MAC address associated with the common access switch. The PDU type determination in certain implementations may include classifying each PDU as an ARP request, an ARP response, a TCP SYN request, a TCP SYN/ACK acknowledgment, a TCP/RST packet, a DNS/NETBEUI name lookup, a DNS/NETBEUI lookup result, and ICMP packet, an outgoing UDP packet, or an incoming UDP packet, and one or more counters are maintained for each classified PDU type for each client. In accordance with other aspects of the disclosure, the method provides remedial actions where the rules set also includes containment actions for the access switch, and the method further includes identifying a type of attack based on the count values, the limits table, and the rules set, as well as initiating a defense action for containing the identified attack type. In certain embodiments, the identification of suspected clients includes comparing at least one of the count values to at least one of the preset limits. In other preferred implementations, moreover, the limits table includes one or more further limits, and the suspect client identification includes performing a mathematical computation using two or more count values to derive a result, and comparing the result to the further limit.

Still other aspects of the disclosure provide a malware detection system in a common access switch of a wireless local area network, where the detection system includes a header data processing component that examines header data of protocol data units (PDUs) at the common access switch to determine a PDU type for each PDU based on the header data, a counter component that maintains count values for individual clients of the common access switch based at least partially on the PDU type, and a limits table including preset limits corresponding to each count value. The system further includes a rules set defining attack patterns for the common access switch, and a malware identification component that selectively identifies clients of the common access switch that are suspected of being infected with malware based at least in part on the count values, the limits table, and the rules set. The counter component in certain embodiments maintains a plurality of counters for each client MAC address associated with the common access switch, and the header data processing component classifies each PDU as one of an ARP request, an ARP response, a TCP SYN request, a TCP SYN/ACK acknowledgment, a TCP/RST packet, a DNS/NETBEUI name lookup, a DNS/NETBEUI lookup result, and ICMP packet, an outgoing UDP packet, and an incoming UDP packet, with the counter component maintaining one or more counters for each classified PDU type for each client. The rules set may include containment actions for the access switch, in which case the malware identification component operates to identify an attack type based on the count values, the limits table, and the rules set, and initiates a defense action for containing the identified attack type. The malware identification component in certain embodiments compares one or more count values to the preset limits, and in further embodiments, the limits table includes at least one further limit, and the malware identification component performs a mathematical computation using two or more count values to derive a result and compares this result to the further limit.

A wireless access switch is provided in accordance with further aspects of the disclosure, including at least one port connectable to a base station access point providing wireless connection between wireless clients and the port via a radio access network, and a malware detection system having a header data processing component, a counter component, a limits table, a rules set, and a malware identification component that selectively identifies access switch clients as being suspected of being infected with malware based at least in part on the count values, the limits table, and the rules set.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which.

DETAILED DESCRIPTION

Figure 1:
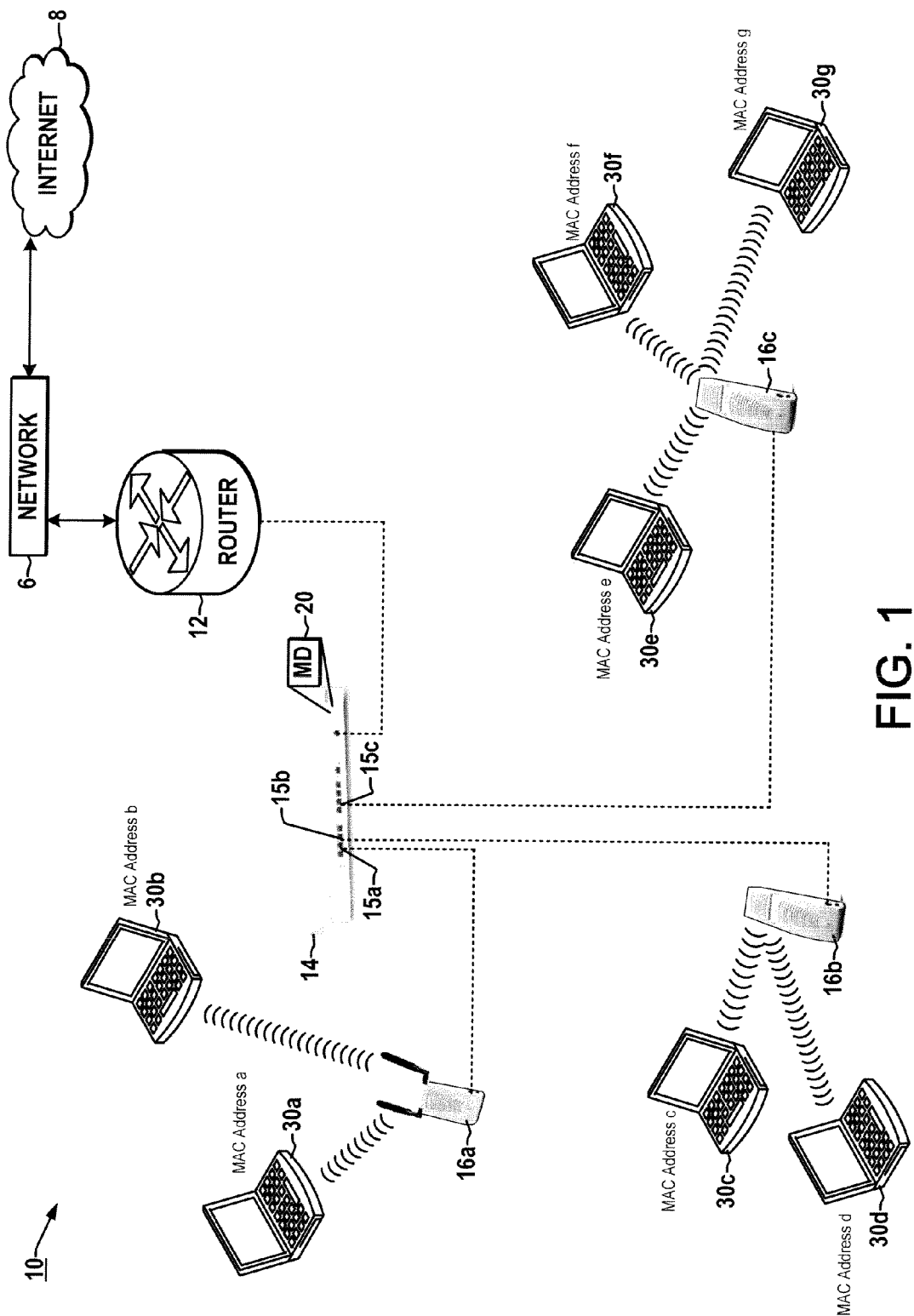
FIG. 1 is a schematic system level diagram illustrating an exemplary portion of a wireless LAN with one or more wireless access switches having malware detection systems to individually identify client devices suspected of being infected with malware such as flash worms in accordance with one or more aspects of the present disclosure.

Several embodiments or implementations of the various aspects of the present disclosure are hereinafter illustrated and described in conjunction with the drawings, wherein like reference numerals are used to refer to like elements. The various aspects of the present disclosure find particular utility in wireless local area networks (LANs) such as WiFi networks, in which access switches connect one or more local access points to a core network via one or more routers or other intervening components, and a plurality of clients may be served by a given access switch port, although the disclosure finds utility in association with other networks types, topologies, and architectures beyond those illustrated and described herein.

Referring initially to FIG. 1, an exemplary wireless local area network (LAN) 10 is illustrated, in which a router 12 provides operative connection to a core network 6 with ultimate connectivity to any number of such networks, including the Internet 8. The router 12 provides communicative interfacing between the network 6 and the LAN 10 via one or more wireless access switches 14, individually including one or more ports 15. Any suitable switch may be used which provides network switch functionality such as Alcatel-Lucent OmniAccess Series 6000, 4324, 4308 switch or the like. One or more ports of the switch 14 are operatively coupled to access points 16a, 16b, 16c in FIG. 1. Any suitable access points 16 may be employed, such as Alcatel-Lucent OmniAccess Series AP60, AP61, AP70 or other access points that operatively interface wireless equipped portable computers or other client devices 30 to a corresponding switch port 15 via a radio access network, where the illustrated access points 16 provide basic radio interface components and functionality with the switch logic being incorporated into the access switch 14. The wireless access points 16 thus constitute nodes of the wireless LAN 10 and function as a central transmitter and receiver of WLAN radio signals, and include a built-in network adapter, one or more antennas, and a radio transmitter supporting WiFi wireless communication standards, and generally may serve and number of client devices 30, such as up to 255 clients 30 in one example. While illustrated in the wireless context using the WiFi access points 16, the concepts of the present disclosure may be employed in connection with wired networks in which common or shared access points 16 are dumb 10/100BaseT hubs or switches or other shared access points that allow aggregate access by multiple devices having unique MAC addresses via a single switch port 15.

As depicted in FIG. 1, in a typical scenario, the individual ports 15 of the switch service more than one client 30, such as clients 30a and 30b being interfaced to one switch port 15a via an access point 16a, with access point 16b interfacing clients 30c and 30d to switch port 15b and access point 16c interfacing clients 30e-30g to switch port 15c. Any number of access points 16 and wireless network clients 30 of the network 10 may be thus operatively communicatively coupled with the network router 12 and networks 6, 8 via appropriate ports 15 of one or more access switches 14. The clients 30 may move from one access point 16 to another.

Figure 2:
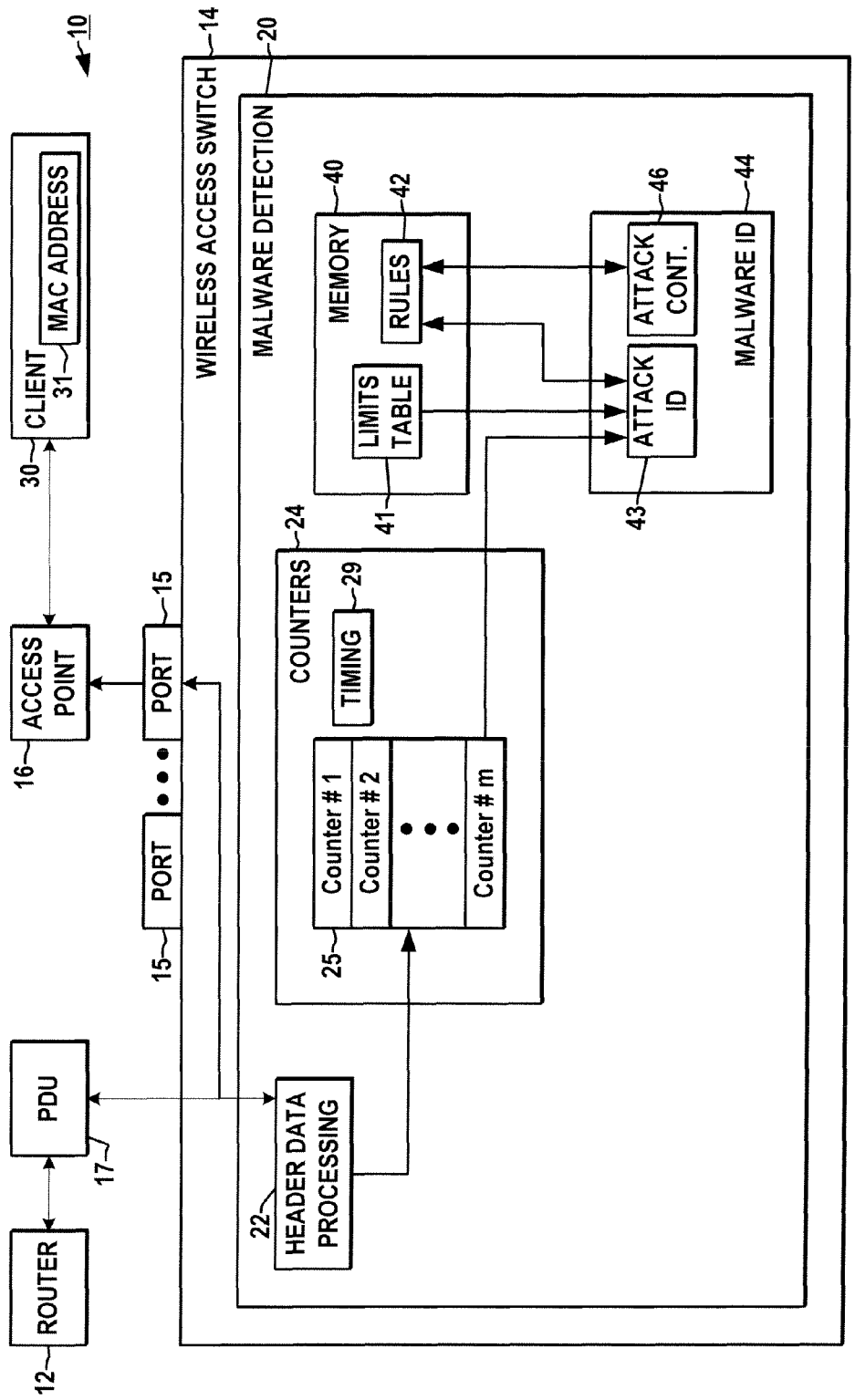
FIG. 2 is a schematic diagram illustrating further details of an exemplary wireless access switch and malware detection components thereof in the network of FIG. 1.

Referring also to FIG. 2, the illustrated WiFi network 10 handles network traffic including packets or other Protocol Data Units (PDUs) 17. As used herein, PDUs include any units through which digital data is transmitted from one point to another over a communication line (wired and/or wireless), including data units formatted according to various transmission protocols, wherein PDUs can be IP packets, TCP packets, frames, etc. generated according to a respective transmission protocol. The PDUs 17 are transferred based on the Media Access Control address (MAC address) 31 of the clients 30, wherein the client MAC addresses 31 are globally unique identifiers (GUIDs) at layer 2 in this implementation in accordance with IEEE 802.11 specifications. In other embodiments, the client addresses as used herein can be MAC addresses or other layer 2 addresses, including without limitation Ethernet Hardware Address (EHA), hardware address, adapter address, or other unique or quasi-unique address identifier associated with network interface cards (NICs) of the clients 30. As the network cards or integral network adapters in any two client devices 30 will have different client addresses (e.g., different MAC addresses in one embodiment), the access switch 14 in the present disclosure can examine the header data of the PDUs 17 to identify a client address 31 with which each PDU 17 is associated, whether incoming or outgoing. Moreover, while it is possible to change the MAC address 31 via spoofing, the malware identification/detection system 20 of the exemplary switch 14 is capable of determining suspected clients uniquely even though a plurality of clients 30 share a common access point 16 (e.g., share a common switch port 15). In this regard, possible client addresses include without limitation IEEE MAC-48, EUI-48, and EUI-64 (extended unique identifier, EUI).

In accordance with the present disclosure, the wireless access switch 14 includes a malware detection system 20, the details of which are best shown in FIG. 2, that includes a header data processing component 22 operative to examine header data of PDUs 17 at the switch 14 to determine a PDU type and a "far-end" address 31 for each PDU 17 based on the header data. The detection system 20 also includes a counter component 24 that includes counters 25 in one embodiment to maintain a plurality of count values for individual clients 30 (e.g., by individual client (e.g., MAC) address) based at least partially on the PDU type determined by the processing component 22.

A memory 40 is provided in the system 20, which includes a limits table 41 comprised of preset limits corresponding to each count value and further limits for comparison with results of mathematical operations performed on two or more of the count values, as well as a set of rules 42 that defines attack patterns for the shared wireless access switch 14. In addition, the system 20 includes a malware identification component 44 including an attack ID component 43 that selectively identifies clients 30 that are suspected of being infected with malware based at least in part on the count values, the limits table 41, and the rules set 42.

The malware detection component 20 operates in certain respects in a manner as described in U.S. patent application Ser. No. 11/656,434, the entirety of which is incorporated herein by reference. In the present disclosure, moreover, the detection component 20 further provides for examining the client address information in the header of the PDUs 17, where the counters 25 and the determination of suspected malware infection is determined on a client address basis, as well as based on a determined PDU type. Thus, counting in the present disclosure is based on per MAC address instead of per physical port. In this manner, the system 20 of the present disclosure advantageously performs malware detection down to the client level in the illustrated network architecture 10 even though two or more of the clients 30 share a common access switch port 15. This detection down to the client level is vulnerable to "spoofing" so normal anti-spoofing procedure is recommended. Moreover, the malware detection system 20 and the individual components thereof may be implemented as any suitable hardware, software, logic, or combinations thereof, and two or more components illustrated and described herein may be combined into a single unitary component, and one or more of the described components may be implemented in distributed fashion as more than one components, or components implemented in different host processing devices operatively coupled with the switch 14, wherein all such embodiments are contemplated as falling within the scope of the present disclosure and the appended claims.

In the illustrated embodiments, the header data component 22 is operative to determine a client MAC address 31 (e.g., or other client address as discussed above) for each PDU 17 through examination of the header data or other data portion of the PDU 17, and the counter component 24 maintains a plurality of counters 25 for each client MAC address associated with the common access switch 14. The exemplary header data processing component 22, moreover, is operative to classify each PDU 17 by type as one of an ARP request, an ARP response, a TCP SYN request, a TCP SYN/ACK acknowledgment, a TCP/RST packet, a DNS/NETBEUI name lookup, a DNS/NETBEUI lookup result, and ICMP packet, an outgoing UDP packet, and an incoming UDP packet. The counter component 24 maintains at least one counter 25 for each classified PDU type for each client address that is being served by the switch 14.

The rules set 42 in certain preferred embodiments includes containment actions for the access switch 14 and the attack ID component 43 of the malware identification component 44 operates to identify a type of attack based on the count values, the limits table 41, and the rules set 42. In this embodiment, moreover, the malware ID component 44 provides an attack containment component 46 that initiates a defense action for containing the identified attack type. In the illustrated implementations, the identification component 44 (e.g., the attack ID component 43 thereof) compares one or more of the count values to at least one of the preset limits in the table 41 to ascertain whether a worm is to be suspected for a given client 30, and the limits table includes further limits regarding comparisons or other relationships between two or more count values for inferring malware activity. In this implementation, the malware identification component 44 performs one or more mathematical computations using two or more count values to derive a result, and compares the result to the further limit from the table, and based on this and the direct count value comparisons, determines whether malware is suspected.

In operation, the system 20 effectively counts packets or other PDUs 17 for each client MAC address 31, with the switch 14 performing PDU encryption/decryption pursuant to the IEEE 802.11 standards, whereby the system 20 adds very little additional processing overhead in scrutinizing the PDUs 17 with respect to MAC address 31 and type. In this regard, the malware detection system 20 may also be implemented in wireline switches to identify worms/malware with respect to specific hosts (as opposed to a port), preferably in conjunction with some form of anti-spoofing in the switch. The solution provided by the present disclosure is therefore a simple design that can be incorporated into the hardware/software in existing network access switches to implement malware detection in the existing "fast path" in the data planes that deal with each PDU 17, by which the disclosure facilitates the provision of access switches having built-in security at very low cost.

The malware detection system 20 establishes and maintains a set of counters 25 and thresholds 41 for each client 30 associated with the switch 14. In operation, the counters are reset periodically, with the thresholds being set so as to discern suspected malware activity, and the reset period and thresholds may be user adjustable for tailoring by network operators. If any of the thresholds is exceeded, the corresponding client device 30 may be advantageously isolated for further analysis or other remedial action via the containment component 46.

In the illustrated embodiment, count values are maintained in the counters 25 for each MAC address as follows. For out-going ARP requests, Total number of ARP requests, and Number of different hosts mentioned. For in-coming ARP responses, Total number of ARP responses, Number of different hosts responding, and Number of responding hosts mentioned in out-going ARP requests. For out-going TCP SYN requests, Total number of SYN requests sent, Number of distinct far-end hosts, and Number of distinct far-end host & port number pairs. For in-coming TCP SYN/ACK acknowledgements, Total number of SYN/ACK received, Number of distinct far-end hosts, Number of distinct far-end host & port number pairs, and Number from hosts/ports that match the host in out-going SYN packets. For in-coming TCP/RST packets, Total number of TCP/RST received, Number of distinct far-end hosts, Number of distinct far-end host & port number pairs, and Number from hosts/ports that match the host in out-going SYN packets. The counters 25 also maintain count values for Total number of out-going (non-ARP, etc.) broadcasts. In addition, count values are maintained in the counters 25 for each MAC address for out-going DNS/NETBEUI name lookups including Total number of lookups and Number of distinct names looked up, and for in-coming DNS/NETBEUI lookup results, the Number that succeed, the Number that fail, and the Number of intermediate results (e.g., DNS queries can result in a forwarding to another DNS server). The counters 25 in the illustrated embodiment further maintain count values as follows: For out-going ICMP packets, a count for each type, and Number of distinct far-end hosts. For out-going UDP packets, Total number of packets sent, Number of distinct far-end hosts, and Number of distinct far-end host & port number pairs. For in-coming UDP packets, Total number of packets received, Number of distinct far-end hosts, Number of distinct far-end host & port number pairs, and Number from hosts/ports that match the host in out-going UDP packets. The present disclosure is not limited to these specific examples. It is noted, also, that while the above includes many counters 25 for each client address, each packet can only be one of the major types above, whereby the processing per PDU 17 is relatively small, and typically involves only a few tests to determine the type and then increment a few counters 25.

As discussed above, the malware ID component 44 operates to compare one or more of the count values to at least one of the preset limits in the table 41, and may also perform mathematical computations using two or more count values to derive a result and compare the result to a further limit from the table 41. In processing each PDU 17, once the counters 25 are updated, the attack ID component 43 checks the count values against the limits 41, according to the following simple counter value comparison tests to identify suspected malware activity:

If countSYN>100 (This catches the worms trying to connect to many hosts). If countUDPout>100 (This catches the worms trying to connect to many hosts with UDP). If countARP>100 (This catches the worms probing the local sub-net).

The exemplary component 44 further performs the following mathematical computations and result comparisons:

If (countSYN−countSYNACK)/countSYN>0.15 (This catches low percentage completion of TCP). If (countUDPout−countUDPin)/countUDPout>0.15 (This catches low percentage completion of UDP). If (countRST+countICMP-nonreachable)>25 (This catches many far-ends that refuse to talk or are unreachable). If ((countSYNhosts>50) & (countSYN−countSYNACK>30)) (This catches the worms trying to connect to many hosts and only getting through to some).

As noted above, these are merely examples, and any number of comparisons, computations, threshold limit values, etc., may be employed in the system 20 on a MAC address basis using the determined PDU types, and all these parameters may be modified by a network operator.

In addition, if a PDU 17 causes a rule to trigger by such comparisons, there can be a number of actions taken via the component 46. In one example, the suspected MAC address 31 can be totally blocked, for example, by dropping all packets from the MAC address 31 (until manually reset), which is preferably used for rules that have very low false-positive. Alternatively, the suspect MAC address 31 can be quarantined to a VLAN that is dedicated to remediation only, where virus scanners and other tools can be brought to bear, or the component 46 may quarantine the MAC address 31 to a honey spot VLAN so that the worm can be observed in action. Another exemplary remedy includes temporarily blocking the MAC address 31, such as for 1 second, then for 2 seconds, then for 4 seconds, doubling each time, which may be advantageous for rules that have fuzzy boundaries when legitimate users may occasionally reach the limit, this action means we only slow down the user at the limits but will eventually block totally if the client 30 is indeed infected. Moreover, since the malware detection system 20 is the "fast" path at the switch 14, action can be taken quickly, including dropping the PDU 17 that triggered the action.

As an example of possible attack detection, assuming a TCP flash worm scans a local sub-net by MAC address 31, a large number of ARP request PDUs 17 will be scrutinized by the system 20, with a smaller number of ARP response PDUs, indicating that the malware is attempting to spread. The ARP PDUs 17 that succeed will be followed by SYN PDUs 17 trying to establish connections. This kind of worm will be caught by any of the following comparisons and trigger conditions, noting that the limit values can be set to other values than those below in different applications:

a. If countARP>100;
  b. If countSYN>100;
  c. If (countSYN−countSYNACK)/countSYN>0.15; or
  d. If countSYNhosts>100.

A UDP flash worm will be detected on similar conditions. A SYN flood attack originating from a client 30 or other "high intensity" attack can be detected by the system 20 by the countSYN limit value, and even "low intensity" attacks will be detectable using a comparison of a (countSYN−countSYNACK)/countSYN" rule 42. In another example, a targeted worm (e.g., one that does not blindly scan addresses, but uses a pre-known list of Mac addresses 31) can be detected by any of the following comparisons/computations:

a. If countARP>100
  b. If countSYN>100
  c. If (countSYN−countSYNACK)/countSYN>0.15
  d. If countSYNhosts>100
  e. If countNameLookup>100

Compared with port-based solutions, the present disclosure can advantageously isolate worms and other malware to a specific client 30, particularly in combination with some form of anti-spoofing. This approach thus avoids the complicated processing of other solutions, provides a means to track the number of far-end hosts and is thus resistant to attackers being able to manipulate detection using pre-knowledge of a particular detection algorithm, provides a combined detection/action plan that gets early alerts without the problems of false-positive alerts, and provides the ability to manage/set limits for individual clients 30.

Figure 3:
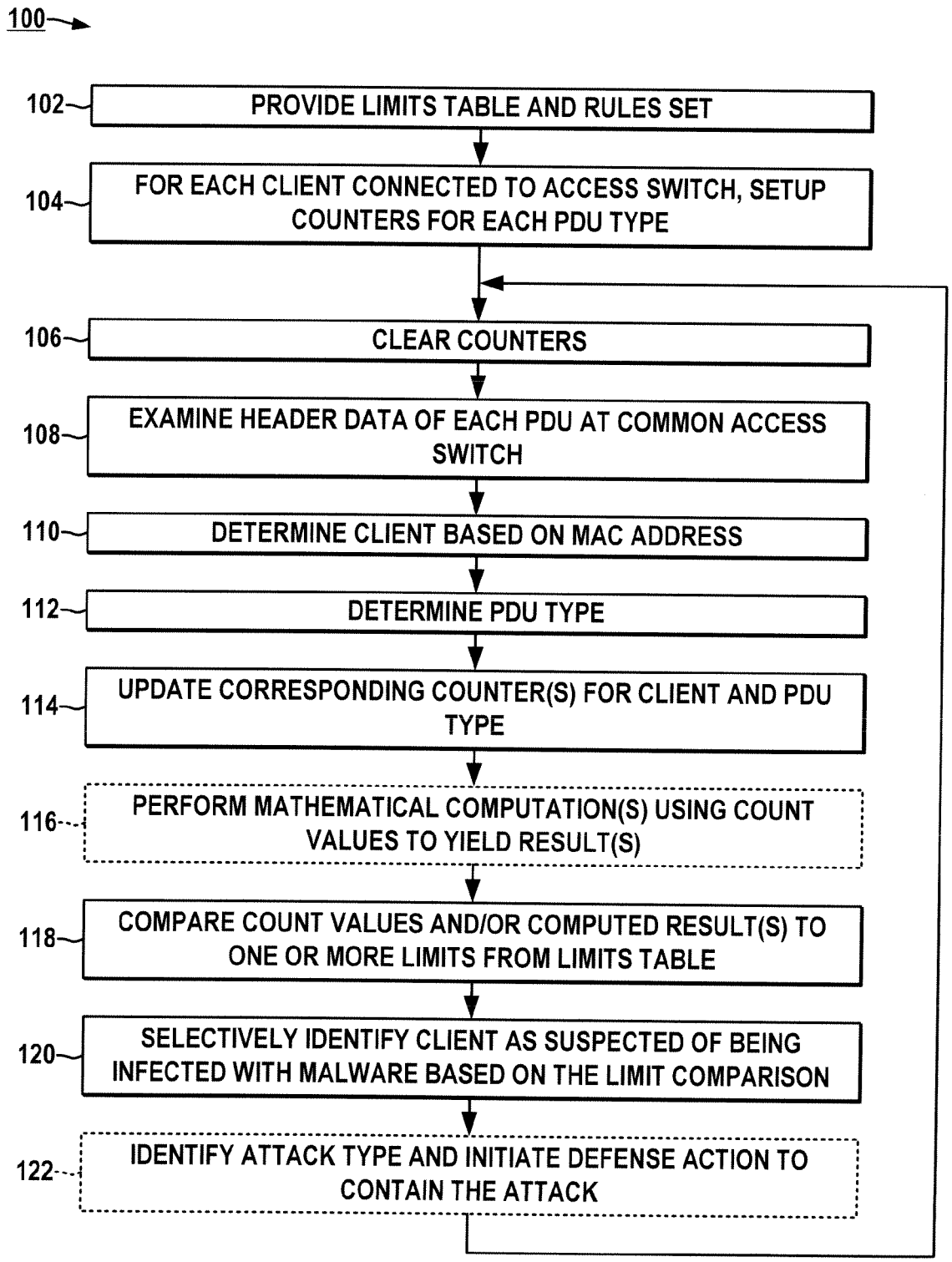
FIG. 3 is a flow diagram illustrating an exemplary method of identifying clients sharing a common access switch in a wireless local area network suspected of being infected with malware in accordance with the present disclosure.

Referring now to FIG. 3, an exemplary method 100 is illustrated for identifying clients 30 sharing a common access switch 14 in a wireless local area network 10 suspected of being infected with malware. While the exemplary method 100 is illustrated and described with respect to FIG. 3 in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the malware detection aspects illustrated and described herein.

The method 100 begins at 102 in FIG. 3 with provision of a limits table 41 and the set of rules 42. Counters 25 are set up at 104 for each client 30 (e.g., each MAC address 31) connected to the switch 14 and for each PDU type, and the counters are cleared at 106. At 108, the header data of protocol data units (PDUS) at the common access switch 14 are examined, and based on this, the client 30 and PDU type are determined at 110 and 112, respectively. The counters 25 corresponding to the determined client 30 and PDU type are updated at 114 and mathematical computations are optionally performed at 116 to compute results. Comparisons are then made at 118 of the count values/results with limits from the limits table 41. At 120, clients 30 are selectively identified that are suspected of being infected with malware based at least in part on the count values, the limits table 41, and the rules set 42. The method 100 may optionally include identifying a type of attack based on the count values, the limits table, and the rules set, and initiating a defense action for containing the identified attack type at 122. This process repeats with the counters being cleared again at the end of each sample period.

Various aspects of the disclosure are illustrated and described in terms of software, or algorithms, and/or symbolic representations of operations on data bits within a computer memory, by which ordinary skilled artisans convey the substance of their work. As such, algorithms, scripts, computations, and other operations of the described components may be implemented as computer implemented steps via programmed software code or other programming or configuration to provide a desired result, where such steps involve manipulation or transformation of physical quantities such as stored memory states in a computer memory. In particular, certain embodiments may include software components operating according to programmed computer-executable instructions stored in an electronic memory, which operate on data and packets (e.g., PDUs 17) sent to or received from the networks 10, 6, 8, which data may be likewise stored in an electronic memory at least for a time, wherein the packets and data described herein may be of any suitable form including without limitation optical, electrical, or magnetic signals capable of being stored, transferred, combined, compared, and otherwise manipulated, and wherein these may be referred to in various terms such as bits, values, elements, symbols, characters, terms, numbers, etc. In this regard, unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices. In addition, the various software implemented aspects of the present disclosure are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosure is not limited by these aspects of any given implementation.

Although the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method of identifying clients sharing a common access switch in a local area network suspected of being infected with malware, the method comprising:
   examining header data of protocol data units (PDUs) at the common access switch;
   determining a PDU type and client address for each PDU based on the header data;
   for individual clients of the common access switch, maintaining a plurality of counters for providing PDU count values based at least partially on the PDU type;
   providing a limits table with preset limits corresponding to each count value, a rules set that defines attack patterns for the common access switch, and at least one further limit; and
   selectively identifying clients of the common access switch that are suspected of being infected with malware based at least in part on the count values, the limits table, and the rules set, wherein identifying suspected clients includes performing a mathematical computation using two or more count values to derive a result, and comparing the result to the further limit.

2. The method of claim 1, wherein determining a client address for each PDU includes determining a client MAC address based on the header data, and wherein a plurality of counters are maintained for each client MAC address associated with the common access switch.

3. The method of claim 1, wherein determining the PDU type includes classifying each PDU as one of an ARP request, an ARP response, a TCP SYN request, a TCP SYN/ACK acknowledgment, a TCP/RST packet, a DNS/NETBEUI name lookup, a DNS/NETBEUI lookup result, and an ICMP packet, and wherein at least one counter is maintained for each classified PDU type for each of a plurality of clients.

4. The method of claim 1, wherein the rules set includes containment actions for the access switch, the method further comprising:
identifying a type of attack based on the count values, the limits table, and the rules set; and
initiating a defense action for containing the identified attack type.

5. The method of claim 1, wherein identifying suspected clients includes comparing at least one of the count values to at least one of the preset limits.

6. A malware detection system in a common access switch of a local area network, comprising:
at least one processor;
a header data processing component implemented using the at least one processor and operative to examine header data of protocol data units (PDUs) at the common access switch to determine a PDU type and a client address for each PDU based on the header data;
a counter component operative to maintain a plurality of count values for individual clients of the common access switch based at least partially on the PDU type;
a limits table comprising preset limits corresponding to each count value, and at least one further limit;
a rules set defining attack patterns for the common access switch; and
a malware identification component implemented using the at least one processor and operative to selectively identifying clients of the common access switch that are suspected of being infected with malware based at least in part on the count values, the limits table, and the rules set, wherein the malware identification component is operative to perform a mathematical computation using two or more count values to derive a result, and to compare the result to the further limit.

7. The system of claim 6, wherein the header data component determines a client MAC address for each PDU based on the header data, and wherein the counter component maintains a plurality of counters for each client MAC address associated with the common access switch.

8. The system of claim 6, wherein the header data processing component is operative to classify each PDU as one of an ARP request, an ARP response, a TCP SYN request, a TCP SYN/ACK acknowledgment, a TCP/RST packet, a DNS/NETBEUI name lookup, a DNS/NETBEUI lookup result, and ICMP packet, an outgoing UDP packet, and an incoming UDP packet, and wherein the counter component maintains at least one counter for each classified PDU type for each of a plurality of clients of the common access switch.

9. The system of claim 6, wherein the rules set includes containment actions for the access switch, and wherein the malware identification component is operative to identify a type of attack based on the count values, the limits table, and the rules set, and to initiate a defense action for containing the identified attack type.

10. The system of claim 6, wherein the malware identification component is operative to compare at least one of the count values to at least one of the preset limits.

11. An access switch for interfacing wireless clients with a network, the access switch comprising:
at least one port for connecting to an access point providing wireless connection between wireless clients and the port network via a radio access network; and
a malware detection system, comprising:
a counter component operative to maintain a plurality of count values for individual clients of the common access switch based at least partially on the PDU type;
a limits table comprising preset limits corresponding to each count value, and at least one further limit;
a rules set defining attack patterns for the common access switch; and
a malware identification component operative to selectively identifying clients of the common access switch that are suspected of being infected with malware based at least in part on the count values, the limits table, and the rules set, wherein the malware identification component is operative to perform a mathematical computation using two or more count values to derive a result, and to compare the result to the further limit.

12. The wireless access switch of claim 11, wherein the header data component determines a client MAC address for each PDU based on the header data, and wherein the counter component maintains a plurality of counters for each client MAC address associated with the common access switch.

13. The wireless access switch of claim 11, wherein the header data processing component is operative to classify each PDU as one of an ARP request, an ARP response, a TCP SYN request, a TCP SYN/ACK acknowledgment, a 20 TCP/RST packet, a DNS/NETBEUI name lookup, a DNS/NETBEUI lookup result, and ICMP packet, an outgoing UDP packet, and an incoming UDP packet, and wherein the counter component maintains at least one counter for each classified PDU type for each of a plurality of clients of the common access switch.

14. The wireless access switch of claim 11, wherein the rules set includes containment actions for the access switch, and wherein the malware identification component is operative to identify a type of attack based on the count values, the limits table, and the rules set, and to initiate a defense action for containing the identified attack type.

15. The wireless access switch of claim 11, wherein the malware identification component is operative to compare at least one of the count values to at least one of the preset limits.

16. The method of claim 1, wherein determining the PDU type includes classifying each PDU as one of an outgoing UDP packet, and an incoming UDP packet and wherein at least one counter is maintained for each classified PDU type for each of a plurality of clients.

* * * * *